United States Patent [19]

Morimoto

[11] 4,095,267

[45] June 13, 1978

[54] CLOCK PULSE CONTROL SYSTEM FOR MICROCOMPUTER SYSTEMS

[75] Inventor: Takao Morimoto, Shizuoka, Japan

[73] Assignee: Tokyo Electric Co., Ltd., Tokyo, Japan

[21] Appl. No.: 744,519

[22] Filed: Nov. 24, 1976

[30] Foreign Application Priority Data

Nov. 29, 1975 Japan .................................. 50-142567

[51] Int. Cl.² ................................................. G06F 1/04
[52] U.S. Cl. ................................................. 364/200
[58] Field of Search .................. 364/200, 200 MS File

[56] References Cited

U.S. PATENT DOCUMENTS

| 3,750,107 | 7/1973 | Pyne .................................. 340/172.5 |
| 3,879,710 | 4/1975 | Maxemchuk et al. ............. 340/172.5 |

OTHER PUBLICATIONS

"Modern Eliminator", in IBM Technical Disclosure Bulletin vol. 17, No. 10, Mar. '75, p. 3073.

Primary Examiner—Gareth D. Shaw
Assistant Examiner—C. T. Bartz
Attorney, Agent, or Firm—Flynn & Frishauf

[57] ABSTRACT

A clock pulse control system for microcomputer systems includes a central processing unit, a plurality of first input/output units, a plurality of second input/output units and a clock pulse generator. The clock pulse generator generates a first clock pulse having a frequency to operate the central processing unit and the first input/output units and a second pulse having the same frequency or a different frequency to operate the second input/output units. Thus, the first input/output units are operated at the same frequency as the central processing unit. The second input/output units are operated by a second clock pulse having an optimum frequency when no information is transferred between the second input/output units and the central processing unit and by a second clock pulse having the operating frequency of the central processing unit when information is transferred between the second input/output units and the central processing unit.

8 Claims, 7 Drawing Figures

F I G. 1
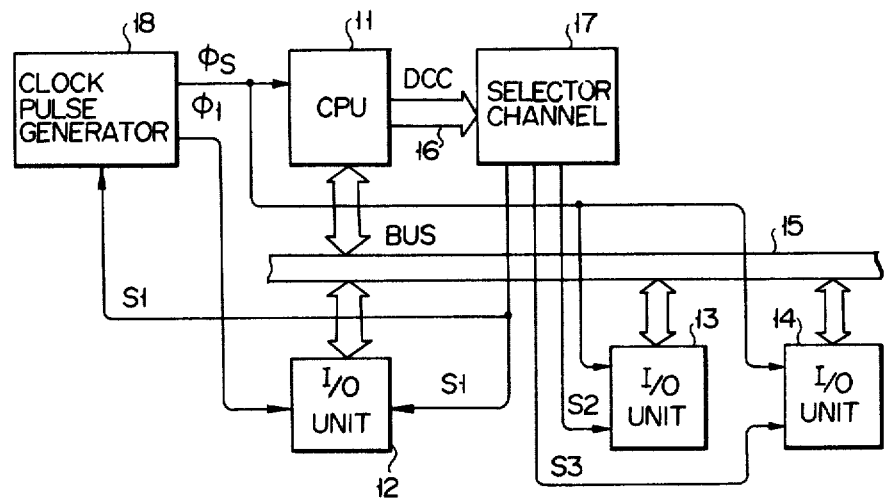
F I G. 2
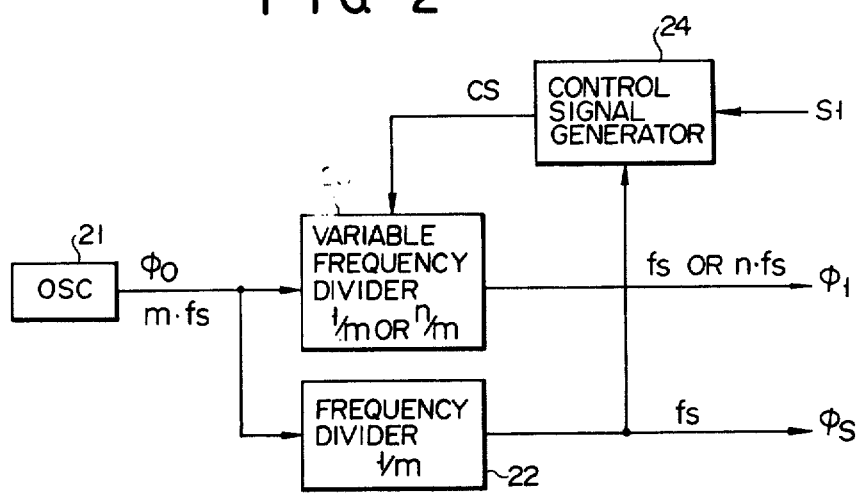

CLOCK PULSE CONTROL SYSTEM FOR MICROCOMPUTER SYSTEMS

BACKGROUND OF THE INVENTION

This invention relates to a clock pulse control system, and more particularly to a clock pulse control system for use in a microcomputer system having a central processing unit (CPU) and a plurality of input/output (I/O) units including an I/O unit to operate at a different speed from that of the CPU.

A microcomputer system compries a CPU including a data processing circuit and a memory device for storing a program or a variable data; a plurality of I/O units connected to CPU, a clock pulse generator for operating the I/O units and CPU, and a selector channel adapted to generate a signal for selecting one or a plurality of I/O units by a device control instruction from CPU.

In the above-mentioned microcomputer system clock pulses having a common freequency with respect to the CPU and I/O units are given from the clock pulse generator to effect an instruction or data transfer between the CPU and the I/O unit selected by the signal of the selector channel.

To the CPU and I/O units is given a frequency band of predetermined range over which they can be operated. A clock pulse having a common frequency with respect to the CPU and I/O units is selected from among their frequency band.

In a microcomputer system, the operating speed of the system including a central processing unit is governed by the frequency of a clock pulse utilized to operate various input/output units connected to the CPU.

For example, where an I/O unit in which that frequency range of a clock pulse as most suited for the operation of the I/O unit is different from that frequency range of the clock pulse as most fitted for the operation of the system, is connected to the above-mentioned system, it is impossible to connect said I/O unit to the microcomputer system when there is no common frequency that can operate said I/O unit and the system.

Where there exists a frequency which permits the system and I/O unit to be operated in a common range shared between the frequency range of the system and the frequency range of the I/O unit, it is possible to operate the system and I/O unit by a clock pulse having such a common frequency.

Where a clock pulse having a common freqeucny can be used to operate the microcomputer system there may occur a case wherein either one of said two types of the input/output units can not operate with an optimum frequency but operates with a frequency substantially different from the optimum frequency. Consequently, it is impossible to operate efficiently both types of the input/output units.

Moreover, when, as mentioned above, respective input/output units have different frequency bands of clock pulse it is necessary to select the clock frequency of the input/output unit having lower operation speed as the common clock frequency. For this reason, in order to make it possible to use a clock frequency in common for different type of input/output units it is necessary to operate an input/output unit at a speed lower than its intrinsic high operating speed. More particularly, any input/output unit has an intrinsic operating speed at which it can operate most efficiently.

For example, the above-mentioned microcomputer system is applied to an electronic cash register and the second input/output unit is formed of a display unit using an indication type multidigit nixie tube. Clock pulses used to operate the CPU of the aforesaid microcomputer system are essentially required to have a frequency ranging between 200 and 300 KHz. In practical application, there are used clock pulses having a frequency of 250 KHz selected from said frequency range. The clock pulse for actuating the display unit have a frequency ranging from 200 KHz to 1 MHz. If, however, said display unit is not operated by a clock pulse having a higher frequency than 400 KHz when dynamically displaying data by itself, then the resultant display pattern will flicker too much to be easily recognized by the human eye.

Accordingly, a disadvantage occurred that it is necessary to make the operating speed of the entire system equal to that of an input/output unit whose operating speed should be limited.

Accordingly, it is an object of this invention to provide a novel clock pulse control system for use in a microcomputer system including an input/output unit operative at a frequency band partially common to, and partially different from, the operating frequency band of a central processing unit.

SUMMARY OF THE INVENTION

According to this invention, a clock pulse control system for microcomputer systems comprises a central processing unit; a plurality of first input/output units connected to said central processing unit; at least one second input/output unit connected to said central processing unit; a selector channel for selecting at least one of said first and second input/output units according to a programmed control instruction from said central processing unit; and a clock pulse generator for generating a first clock pulse for operating the central processing unit and the first input/output unit and a second clock pulse having an optimum operation frequency to operate said at least one second input/output unit when the second input/output unit does not effect data transfer with respect to central processing unit.

In the clock pulse control system according to this invention, only when information is transferred between the central processing unit and the second input/output unit, said second input/output unit operates at a common operating speed synchronous with that of the central processing unit. At other times the second input/output unit and the central processing unit are operated at the optimum operating speed.

BRIEF DESCRIPTION OF THE DRAWINGS

FIG. 1 is a block diagram showing one embodiment of the clock pulse control system of this invention;

FIG. 2 is a block diagram showing the clock pulse generator utilized in the system shown in FIG. 1;

DETAILED DESCRIPTION

Figure 3:
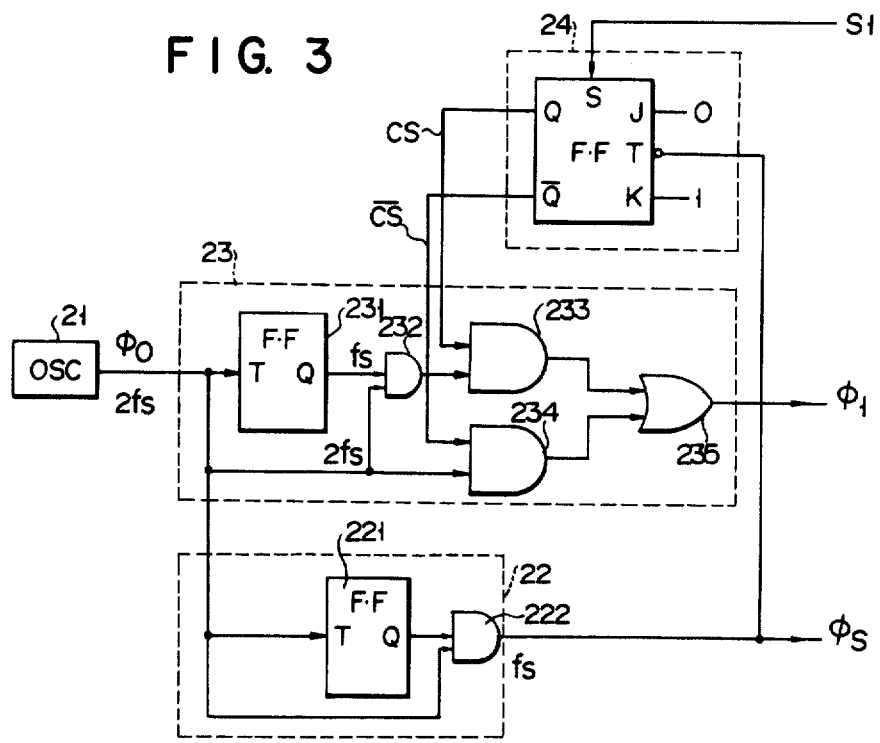
FIG. 3 is a block diagram showing the details of the clock pulse generator shown in FIG. 2.

With reference now to FIG. 1, a central processing unit (CPU) 11 is connected to first input/outut units (I/O unit) 13 and a 14 and second input/output unit (I/O unit) 12 through a bus 15. Th CPU 11 is provided with a data processing circuit and a memory device to store a program, variable data, etc. The first I/O units 13 and 14 are, for example, printers, typewriters or other units which operate in synchronism with the CPU 11. The second I/O unit 12 is, for example, a display unit, a key board unit or the like which operate with frequency band differernt from that of the CPU 11. Furthermore, the CPU 11 is coupled with a selector channel 17 through a bus 16. The selector channel 17 has a construction well known in computer art and operates to generate selection signals S1, S2 and S3 corresponding to respective I/O units 12, 13 and 14 in response to a device control command DCC from the CPU 11. These selection signals select a predetermined I/O unit coupled with the CPU 11. With the connection described above when the second I/O unit 12 is operated by a clock pulse having a frequency commonly utilized for the CPU 11 and the first I/O units 13 and 14 although the unit 12 can exchange data and instructions with the CPU 11, it can not operate efficiently because of its different clock pulse frequency. Thus, for example where the second I/O unit 12 is a display unit it would be difficult to display data at such a speed that one cannot identify the displayed data. In this manner, it is impossible to efficiently exchange communication between the second I/O unit and an operator.

A clock pulse generator 18 is provided for generating two types of clock pulses, that is a first clock pulse $\phi S$ having a frequency $fs$ suitable to operate the CPU 11 and the first I/O units 13 and 14, and a second clock pulse $\phi 1$ having a frequency $n \cdot fs$ (where $n$ is an positive integer) which is $n$ times of the frequency $fs$ of the first clock pulse $\phi S$. The frequency $n \cdot fs$ of the second clock pulse $\phi 1$ is a frequency suitable for effecting communication between the second I/O unit 12 and the operator. The clock pulse generator 18 supplies the first clock pulse $\phi S$ to the CPU 11 and to the first I/O units 13 and 14 and the second clock pulse $\phi 1$ to the second I/O unit 12. The clock pulse generator 18 operates to switch the frequency of the second clock pulse $\phi 1$ between the first frequency $n \cdot fs$ and the second frequency $fs$ in response to the logical level of the first selection signal S1 sent from the selector channel 17.

FIG. 2 shows the detail of the clock pulse generator 18 shown in FIG. 1. An oscillator 21 produces a clock pulse $\phi 1$ having a frequency of $m \cdot fs$ (where $m$ is a positive integer) which is applied to the frequency divider 22 and a variable frequency divider 23. The frequency divider 22 has a ratio of frequency division of $1/m$, thus producing the first clock pulse having the frequency of $fs$, whereas the variable frequency divider 23 operates with a ratio of frequency division of either $1/m$ or $n/m$ in accordance with a control signal CS, thereby producing the second clock pulse $\phi 1$ having a frequency corresponding to the selected ratio of frequency division. The variable frequency divider 23 is provided with a control circuit means for selecting the ratio of frequency division. Such variable frequency divider is well known in the art. The control signal CS is provided by a control signal generator 24 controlled by the first selected signal S1. Accordingly, the frequency divider 22 produces a first clock pulse $\phi S$ having a frequency of $fs$ by frequency dividing the clock pulses $\phi 0$ of the oscillator 21 by means of a divide-by-$m$ ($1/m$) frequency divider. The variable frequency divider 23 operates at the ratio of frequency division of $n/m$ in the presence of the control signal CS but operates at the ratio of frequency division of $n/m$ in the absence of the control signal CS to produce the second clock pulse $\phi 1$ of respective divided freqquencies. As the first clock pulse $\phi S$ is applied to the control signal generator 24 the first and second clock pules $\phi S$ and $\phi 1$ are synchronous.

In the control system of this invention, since the second clock pulse $\phi 1$ generated by the clock pulse generator 18 is applied to the second I/O unit 12 whereas the first clock pulse $\phi S$ is applied to the CPU 11 and the first I/O units 13 and 14, the computer system can operate according to a predetermined program.

More particularly, to transfer data or an instruction between the CPU 11 and the second I/O unit 12, a device control signal DCC is applied to the selector channel 17 from CPU 11 through the bus 16 under the control of the program stored in the CPU. In response to this control signal DCC, the selector channel 17 produces the select signal S1 which selects the second I/O unit 12, for example. The select signal S1 is also applied to the clock pulse generator 18. When the selector channel 17 does not produce the select signal S1, a relation $f1 = n \cdot fs$ ($n$ is a positive integer) holds betweem the frequency $f1$ of the second clock pulse $\phi 1$ and the frequency $fs$ of the first clock pulse $\phi S$. Accordingly, the second I/O unit 12 operates correctly to communicate with an operator. Where the selector channel 17 produces the select signal S1, the frequency $f1$ of the second clock pulse $\phi 1$ produced by the clock pulse generator 18 is switched from $n \cdot fs$, to $fs$ thus synchronizing the second clock pulse $\phi 1$ with the first clock pulse $\phi S$ so that the CPU 11 and the second I/O unit 12 are synchronized with each other. At this time, as above described, the control signal generator 24 generates the control signal CS which is applied to the variable frequency divider 23 to switch the frequency of the second clock pulse $\phi 1$ from $n \cdot fs$ to $fs$.

FIG. 3 shows the details of the circuit shown in FIG. 2, in which the numerical data $m$ and $n$ are selected to be $m = 2$ and $n = 2$. Accordingly, the ratios of frequency division are $n/m = 1$ and $1/m = \frac{1}{2}$. The frequency divider 22 comprises a one stage JK flip-flow circuit 221 and an AND gate circuit 222, whereas the variable divider 23 comprises a one stage JK flip-flop circuit 231 and an AND gate circuit 232, and the control circuit for selecting the ratio of frequency division constituted by AND gate circuits 233 and 234 and an OR gate circuit 235. The control signal generator 24 comprises a clock JK flip-flop circuit.

Figure 4:
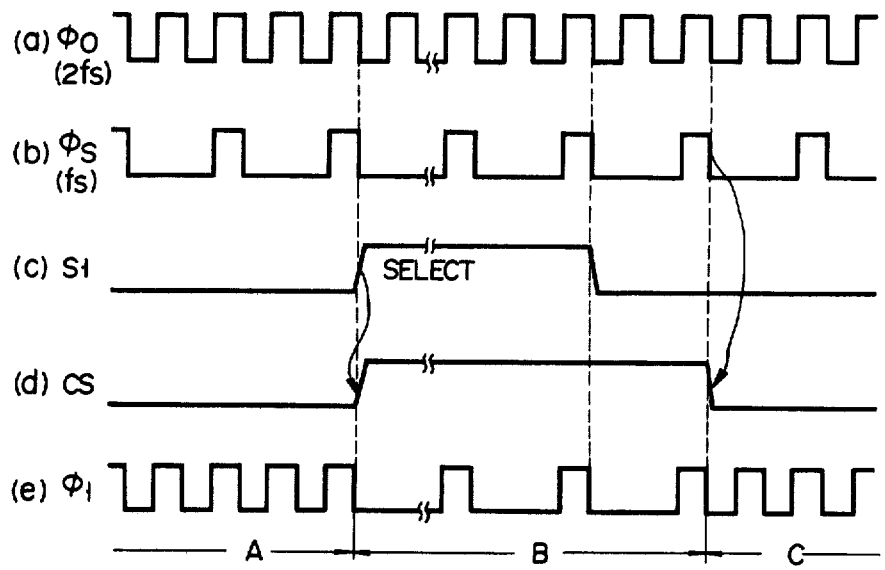
FIG. 4 shows waveforms useful to explain the operation of the circuit shown in FIG. 3.

The operation of the circuit shown in FIG. 3 will be described with the air of the waveforms shown in FIG. 4. The clock pulse generator 21 produces a clock pulse $\phi 0$ having a frequency of $2fs$ as shown in FIG. 4($a$). The frequency of the clock pulse $\phi 0$ is reduced to $\frac{1}{2}$ by the flip-flop circuit or the frequency divider 22 to produce the first clock pulse $\phi S$ having frequency $fs$ as shown in FIG. 4($b$). During the intervals A and C in which information is not transferred between the second I/O unit 12 and CPU 11 but transferred between CPU 11 and the first I/O units 13 and 14, the control signal CS is not produced so that the second clock pulse $\phi 1$ having frequency of $2fs$ is applied to the second I/O unit 12.

Where CPU 11 is used to display information by the second I/O unit 12, the CPU sends the device control command DCC to the selector channel 17 according to the program. As shown in FIG. 4(c), the selector channel 17 generates the select signal S1 which is sent to the clock pulse generator 18 and the second I/O unit 12. When the control signal generate 24 has received the select signal S1, the flip-flop circuit is set for applying control signal CS at a logical level "1" as shown in FIG. 4(d) to one input of the AND gate circuit 233. Since a control signal CS at a logical level "0" is applied to one input of the AND gate circuit 234, it will not be enabled. Since the clock pulse $\phi 0$ whose frequency has been reduced to ½ by the flip-flop circuit 231 is being applied to the other input of the AND gate circuit 233, the OR gate circuit 235 produces the clock pulse $\phi 1$ of frequency is during an interval B in which the control signal is applied as shown in FIG. 4(e) It is noted that the lengths of the intervals in which the select signal S1 and the control signal CS are produced respectively are not equal as shown in FIG. 4. However, according to this invention, since the output from the frequency divider 22 is applied to the control signal generator 24 the control signal CS is synchronized with the second clock pulse $\phi S$ with the result that the first and second clock pulses $\phi S$ and $\phi 1$ are in perfect synchornism. In this embodiment, the select signal is generated by the CPU 11 only for one period of the second clock pulse $\phi S$. A maximum of two periods of the second clock pulse $\phi S$ are necssary to synchronize the second I/O unit 12 and the CPU 11.

In the microcomputer system controlled buy the control system of this invention, while data or information is transferred between the second I/O unit 12 and the CPU 11, the second I/O unit 12 operates at the frequency $fs$ of the second clock pulse $\phi S$ but it operates at an optimum frequency $2fs$ of the clock pulse in other intervals. Accordingly, with the clock pulse control system of this invention it is impossible to efficiently incorporate into the system an I/O unit having an operating speed above or below the limit of the CPU operating speed, thus providing a flexible microcomputer system.

For example, the above-mentioned microcomputer system is applied to an electronic cash register and the second input/output unit 12 is formed of a display unit using an indication type multidigit nixie tube. Clock pulse $\phi S$ used to operate the CPU of the aforesaid microcomputer system are essentially required to have a frequency ranging between 200 and 300 KHz. In practical application, clock pulses having a frequency $fs$ of 250 KHz are selected from said frequency range. The clock pulses $\phi 1$ for actuating the display unit have a frequency ranging from 200 KHz to 1 MHz. If, however, said display unit is not operated by a clock pulse $\phi 1$ having a higher frequency than 400 KHz when dynamically displaying data by itself, then the resultant display pattern will flicker too much to be easily recognized by the human eye. Generally, therefore, the display unit is actuated by clock pulses $\phi 1$ having a frequency $2fs$ of 500 KHz which is most adapted for a distinct display of data. Only transfer of data from the CPU to the display unit is carried out by clock pulses $\phi 1$ having a frequency $fs$ of 250 KHz. Accorrdingly, the microcomputer system according to this invention can effect a data transfer and data display without trouble.

Although in the foregoing embodiment only one second I/O unit was shown, it is possible to add another second I/O unit having an operating speed different from those of said first I/O units and the CPU. In this case, the additional I/O unit can be controlled in the same manner as the shown second I/O unit.

Figure 5:
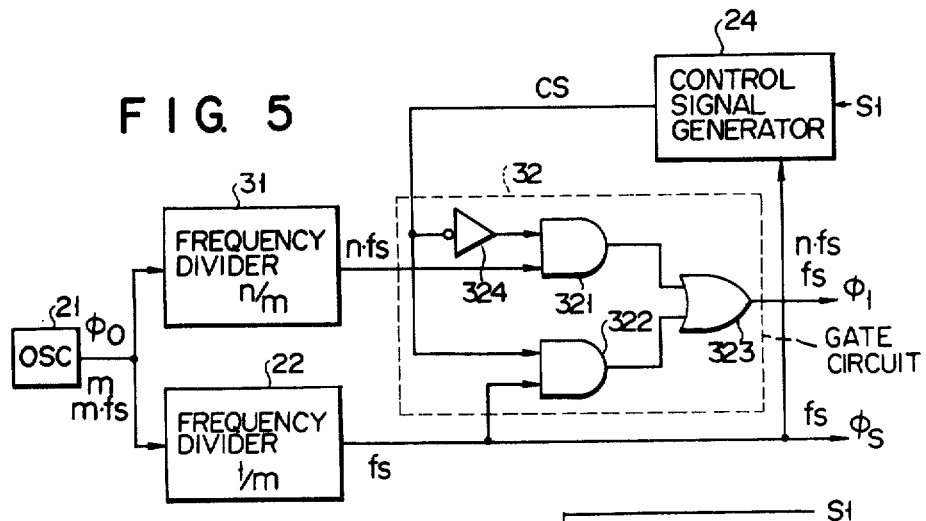
FIG. 5 is a block diagram showing a modified clock pulse generator.

Another embodiment of this invention will now be described. The clock pulse generator 18 shown in FIG. 1 can be constructed as shown in FIG. 5 in which the same elements as those shown in FIG. 3 are designated by the same reference numerals. The clock pulse generator shown in FIG. 5 comprises an osciillator 21, a frequency divider 22 having a ratio of frequency division of $1/m$, a frequency divider 31 having a ratio of frequency division of $n/m$, a gate circuit 32 for selectively switching the outputs from the frequency dividers 22 and 31 and a control signal generator 24 for producing a control signal CS for controlling the gate circuit 32. The gate circuit 32 comprises two AND gate circuits 321 and 322, an OR gate circuit 323 for producing the logical sum of the outputs of the two AND gate circuits and an inverter 324 for inverting the control signal CS. The other elements are identical to those shown in FIG. 3.

It is assumed that the oscillator 21 produces a clock pulse $\phi 0$ having a frequency of $m \cdot fs$, and that this frequency is reduced to $1/m$ by the frequency divider 22 to produce the first clock pulse $\phi S$ having a frequency of $fs$ and to $n/m$ by the frequency divider 31 to produce a clock pulse having a frequency of $n \cdot fs$. When the select signal S1 is not applied to the control signal generator 24, the control signal CS remains at the logical level "0". Since this control signal CS is inverted by the inverter 324 a signal of logial level "1" will be applied to one input of the AND gate circuit 321. Accordingly, the output clock of the tfrequency divider 31 is converted into the clock pulse $\phi 1$ having the frequency of $n \cdot fs$ via AND gate circuit 321 and OR gate circuit 323.

On the other hand when the select signal S1 is applied to the control signal generator signal 24 it will produce a control signal CS having a logical level "1". As a consequence, the output clock pulse from the frequency divider 22 appears as the clock pulse $\phi 1$ having the frequency of $fs$ via the AND gate circuit 322 and the OR gate circuit 323. Accordingly, the circuit shown in FIG. 5 operates in the same manner as the clock pulse generator shown in FIG. 3.

Figure 6:
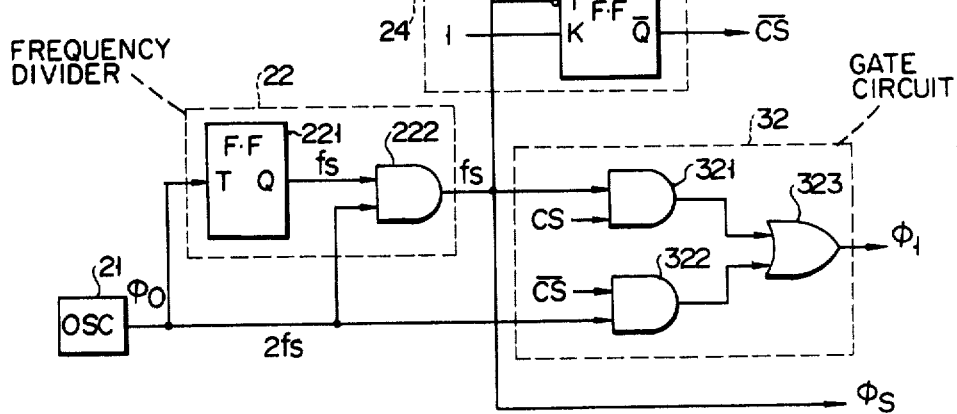
FIG. 6 is a block diagram showing the details of the clock pulse generator shown in FIG. 5.

FIG. 6 shows the details of the circuit shown in FIG. 5, in which $m = 2$ and $n = 2$. The ratio of frequency division of the frequency divider 31 is 1 so that this frequency divider is not specifically shown. The frequency divider 22 is constituted by a one stage flip-flop circuit 221 and an AND gate circuit 222. The inverter 324 shown in FIG. 5 is omitted and the output $\overline{CS}$ from the Q output of the clocked flip-flop circuit 24 is used. The circuit elements and the operation of the modified clock pulse generator are identical to those of FIG. 3.

Figure 7:
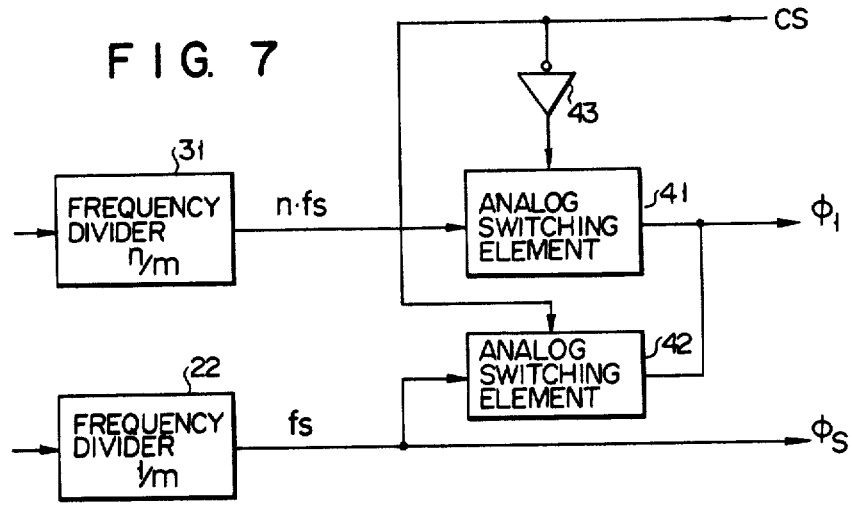
FIG. 7 is a clock diagram showing a still further modification of the clock pulse generator.

The gate circuit 32 shown in FIG. 5 may be constructed by the circuit shown in FIG. 7 wherein a pair of analogue switching elements 41 and 42 corresponding to frequency dividers 31 and 32 are used. The analogue switching elements 41 and 42 may be formed of complementary metal oxide semiconductors (C-MOS) in the form of integrated circuits. The analogue switch 41 is controlled by control signal CS via an inverter 43, while the analogue switch 42 is controlled directly by the control signal CS. Accordingly, the clock pulses from the frequency dividers 22 and 31 are selectively switched by the analogue switching elements 41 and 42 so that the frequency of the clock pulse $\phi 1$ is switched between frequencies $n \cdot fs$ and $fs$ according to the presence or absence of the control signal CS.

What is claimed is:

1. A clock pulse control system for microcomputer systems, comprising:
   a central processing unit (11);
   a plurality of first input/output units (13,14) connected to said central processing unit (11);
   at least one second input/output unit (12) connected to said central processing unit (11);
   a selector channel (17) connected between said central processing unit (11) and said first and second input/output units and adapted to selectively issue a select signal (S1) and to select at least one of said first and second input/output units according to a programmed control instruction from said central processing unit; and
   a clock pulse generator (18) connected to said selector channel 17, to said central processing unit (11) and to said first and second input/output units for supplying clock pulses to said central processing unit and to said first and second input/output units, and adapted to generate a first clock pulse ($\phi s$) having a frequency ($fs$) to operate said central processing unit and said first input/output units (13,14) and a second clock pulse ($\phi 1$) having an optimum frequency ($n \cdot fs$) to operate said at least one second input/output unit (12) when no select signal (S1) is applied to the generator (18) from the selector channel (17) and having the operating frequency ($fs$) of said central processing unit when a select signal (S1) is applied to the generator (18) from the selector channel (17),
   whereby said at least one second input/output unit (12) is operated by said second clock pulse ($\phi 1$) having the operating frequency ($fs$) of said central processing unit only when information is transferred between the central processing unit and said at least one second input/output unit (12), and is operated by said second clock pulse ($\phi 1$) having the optimum frequency ($n \cdot fs$) when no information is transferred between said central processing unit and said at least one second input/output unit.

2. The clock pulse control system of claim 1, wherein said clock pulse generator (18) comprises:
   an oscillator (21) for generating a clock pulse ($\phi 0 = mfs$);
   a first frequency divider (22) coupled to said oscillator for reducing the frequency ($mfs$) of said clock pulse ($\phi 0$) at a first ratio ($1/m$) of frequency division;
   a control signal generator (24) coupled to said first frequency divider (22) and to said selector channel (17) for generating a control signal ((CS) upon receipt of a select signal (S1) from said selector channel (17) and a first clock pulse ($\phi s$) of the frequency ($fs$) from said first frequency divider (22);
   a variable frequency divider (23) coupled to said control signal generator (24) and to said oscillator (21) for reducing the frequency ($m \cdot fs$) of a clock pulse ($\phi 0$) from said oscillator (21) at said first ratio ($1/m$) when said control signal generator (24) generates a control signal (CS) and at a second ratio ($n/m$) when said control signal generator (24) generates no control signal (CS).

3. The clock pulse control system of claim 2, wherein said variable frequency divider (23) includes a control circuit means which comprises:
   a first AND gate circuit (232) for delivering a clock pulse of a first frequency ($fs$) upon receipt of a clock pulse of first frequency ($fs$) and a clock pulse of a second frequency ($2fs$) from said oscillator (21);
   a second AND gate circuit 233 delivering a clock pulse of a first frequency ($fs$) upon receipt of the clock pulse from said first AND circuit (232) and a control signal (CS) from said control signal generator (24);
   a third AND gate circuit (234) for delivering a clock pulse of a second frequency ($2fs$) upon receipt of a clock pulse of said second frequency ($2fs$) from said oscillator (21) and no control signal (CS) from said control signal generator (24); and
   an OR gate circuit (235) connected to said second and third AND circuits (233,234).

4. The clock pulse control system of claim 2 wherein said control signal generator comprises a clocked flip-flop circuit.

5. The clock pulse control system according to claim 1, wherein said clock pulse generator (18) comprises:
   an oscillator (21) for generating a clock pulse ($\phi 0 = mfs$);
   a first frequency divider (22) coupled to said oscillator for reducing the frequency of said clock pulse ($\phi 0$) at a first ratio ($1/n$) of frequency division;
   a second frequency divider (31) coupled to said oscillator for reducing the frequency of said clock pulse ($\phi 0$) at a second ratio ($n/m$) of frequency division;
   a control signal generator (24) coupled to said selector channel (17) for generating a control signal (CS) upon receipt of a select signal (S1) from said selector channel (17) and a clock pulse ($\phi s$) of fist frequency ($fs$) from said first frequency divider (22); and
   gate means (32) coupled to said control signal generator and responsive to said control signal (CS) for selectively passing one of the outputs of said first and second frequency dividers (22,31).

6. The clock pulse control system of claim 5, wherein said gate means (32) comprises:
   a first AND gate circuit (322) connected to said first frequency divider (22);
   a second AND gate circuit (321) connected to said second frequency divider (31);
   an OR gate circuit (323) connected to said first and second AND circuits got producing the logical sum of the outputs of said first and second AND gate circuits; and
   an inverter (324) coupling said control signal from said control signal generator gate circuits for inverting said control signal. to one of said first and second AND 7. The clock pulse control system of claim 5, wherein said gate means (32) includes analog switching means (41,42) responsive to said control signal (CS) for selecting one of the outputs of said first and second frequency dividers (22,31).

8. The clock pulse control system of claim 1, wherein said second input/output unit is a display device.

UNITED STATES PATENT AND TRADEMARK OFFICE
CERTIFICATE OF CORRECTION

PATENT NO. : 4,095,267
DATED : June 13, 1978
INVENTOR(S) : Takao MORIMOTO

It is certified that error appears in the above-identified patent and that said Letters Patent are hereby corrected as shown below:

Column 8, line 22, after "generator" insert --(24)--;

line 30, change "(1/n)" to --(1/m)--;

line 37, change "fist" to --first--;

line 51, after "AND" insert --gate--;

change "got" to --for--;

change lines 55-57 to read as follows:

--said control signal generator (24) to one of said first and second AND gate circuits for inverting said control signal.--.

Signed and Sealed this

Third Day of April 1979

[SEAL]

Attest:

RUTH C. MASON
Attesting Officer

DONALD W. BANNER
Commissioner of Patents and Trademarks